(12) United States Patent
Uno et al.

(10) Patent No.: US 9,797,129 B2
(45) Date of Patent: Oct. 24, 2017

(54) WATERPROOF SHEET FOR OUTDOOR TANK AND METHOD FOR APPLYING SAME

(71) Applicant: SHIN-ETSU CHEMICAL CO., LTD., Tokyo (JP)

(72) Inventors: Takao Uno, Annaka (JP); Yoshiyuki Shiono, Annaka (JP); Akihiro Endo, Annaka (JP); Takeshi Nakajima, Tokyo (JP); Hisaharu Yamaguchi, Annaka (JP); Masahiro Yoda, Annaka (JP)

(73) Assignee: SHIN-ETSU CHEMICAL CO., LTD., Tokyo (JO)

( * ) Notice: Subject to any disclaimer, the term of this patent is extended or adjusted under 35 U.S.C. 154(b) by 145 days.

(21) Appl. No.: 14/435,639

(22) PCT Filed: Aug. 19, 2013

(86) PCT No.: PCT/JP2013/072084
§ 371 (c)(1),
(2) Date: Apr. 14, 2015

(87) PCT Pub. No.: WO2014/061344
PCT Pub. Date: Apr. 24, 2014

(65) Prior Publication Data
US 2015/0267399 A1   Sep. 24, 2015

(30) Foreign Application Priority Data

Oct. 15, 2012   (JP) .................................. 2012-227968

(51) Int. Cl.
| | |
|---|---|
| *B31B 7/02* | (2006.01) |
| *E04B 1/66* | (2006.01) |
| *B29C 65/00* | (2006.01) |
| *B32B 7/12* | (2006.01) |
| *B32B 25/08* | (2006.01) |
| *B32B 25/20* | (2006.01) |
| *C09J 7/02* | (2006.01) |
| *B29L 31/00* | (2006.01) |

(52) U.S. Cl.
CPC ............. *E04B 1/665* (2013.01); *B29C 66/53* (2013.01); *B32B 7/12* (2013.01); *B32B 25/08* (2013.01); *B32B 25/20* (2013.01); *C09J 7/0282* (2013.01); *B29L 2031/7126* (2013.01); *B32B 2307/51* (2013.01); *B32B 2307/712* (2013.01); *B32B 2307/726* (2013.01); *B32B 2307/7265* (2013.01); *B32B 2307/748* (2013.01); *C09J 2201/606* (2013.01); *C09J 2201/622* (2013.01); *C09J 2483/00* (2013.01); *C09J 2483/006* (2013.01); *Y10T 428/24967* (2015.01); *Y10T 428/28* (2015.01); *Y10T 428/2852* (2015.01); *Y10T 428/31663* (2015.04)

(58) Field of Classification Search
CPC ............. B29C 66/53; B29L 2031/7126; B32B 2307/51; B32B 2307/712; B32B 2307/726; B32B 2307/7265; B32B 2307/748; B32B 2419/00; B32B 25/04; B32B 25/08; B32B 25/20; B32B 3/08; B32B 3/10; B32B 5/08; B32B 7/02; B32B 7/12; E04B 1/665; Y10T 428/24967; Y10T 428/28; Y10T 428/2852; Y10T 428/31663
See application file for complete search history.

(56) References Cited

U.S. PATENT DOCUMENTS

| | | |
|---|---|---|
| 2005/0106387 A1 | 5/2005 | Ishikawa et al. |
| 2006/0008662 A1 | 1/2006 | Arai et al. |
| 2010/0167047 A1 | 7/2010 | Ise et al. |
| 2011/0171480 A1 | 7/2011 | Mori et al. |
| 2012/0247033 A1 | 10/2012 | Nakajima et al. |

FOREIGN PATENT DOCUMENTS

| | | |
|---|---|---|
| EP | 2 327 544 A1 | 6/2011 |
| EP | 2 505 629 A1 | 10/2012 |
| JP | 56-64978 A | 6/1981 |
| JP | 58-11689 A | 1/1983 |
| JP | 4-76673 A | 3/1992 |
| JP | 5-98241 A | 4/1993 |
| JP | 8-198384 A | 8/1996 |

(Continued)

OTHER PUBLICATIONS

Extended European Search Report dated May 17, 2016, in European Patent Application No. 13846565.3.

(Continued)

*Primary Examiner* — Aaron Austin
*Assistant Examiner* — Lawrence Ferguson
(74) *Attorney, Agent, or Firm* — Birch, Stewart, Kolasch & Birch, LLP (57) ABSTRACT

Provided is a waterproof sheet such that an adhesive layer is formed on a substrate rubber layer and characterized by the substrate rubber layer comprising a silicone rubber having a JIS-A hardness of 15-90, a tensile strength of at least 3 MPa, an elongation of 100-800%, and a crescent tear strength of at least 3 kN/m. The waterproof sheet can be used without a long-term decrease in material properties, and is waterproof in the long-term. In particular, the present invention can be a waterproof sheet able to withstand long-term use by means of stipulating the material properties of the substrate rubber. By means of a method for applying waterproofing to an outdoor tank, it is possible to reliably waterproof the bottom side of the outdoor tank by means of a simple application method.

7 Claims, 3 Drawing Sheets

(56) References Cited

FOREIGN PATENT DOCUMENTS

| JP | 9-88252 A | 3/1997 |
|----|-----------|--------|
| JP | 2000-273419 A | 10/2000 |
| JP | 2000-320085 A | 11/2000 |
| JP | 2006-52384 A | 2/2006 |
| JP | 2008-231812 A | 10/2008 |
| JP | WO 2010/032728 A1 | 3/2010 |
| JP | 2010-143976 A | 7/2010 |
| JP | 2012-153129 A | 8/2012 |

OTHER PUBLICATIONS

Invitation to Respond to Written Opinion dated May 5, 2016, in Singapore Patent Application No. 11201502924Q.
Office Action dated Oct. 13, 2015, in Japanese Patent Application No. 2012-227968.
International Search Report, issued in PCT/JP2013/072084, dated Sep. 10, 2013.
Written Opinion of the International Searching Authority, issued in PCT/JP2013/072084, dated Sep. 10, 2013.

WATERPROOF SHEET FOR OUTDOOR TANK AND METHOD FOR APPLYING SAME

TECHNICAL FIELD

This invention relates to a waterproof sheet which is used with an outdoor tank, typically a large volume tank as often installed in oil refinery plants or the like, for preventing rainwater from entering the boundary region between the bottom side of the tank and the foundation, and a method for applying the waterproof sheet.

BACKGROUND ART

In conjunction with an outdoor tank, typically a large volume tank as often installed in oil refinery plants or the like, one problem known from the past is that rainwater enters the boundary region between the bottom side of the tank and the foundation. The problem is addressed by covering the boundary region between the bottom side of the large tank and the foundation, e.g., concrete, with a pressure-sensitive adhesive butyl-based rubber sheet for preventing the entry of rainwater. However, since the PSA butyl-based rubber sheet is poor in weather resistance, heat resistance and freeze resistance, it fails to prevent the entry of rainwater over a long period of time, allowing rust generation at the bottom of the outdoor tank, with potential tank failure.

It is noted that the prior documents pertinent to the invention are JP-A H08-198384 (Patent Document 1) and JP 4076673 (Patent Document 2).

SUMMARY OF INVENTION

Technical Problem

An object of the invention, which has been made under the above circumstances, is to provide a waterproof sheet which serves over a long term without losing its physical properties, maintains waterproofness over a long term, and is suitable to apply to a boundary region between an outdoor tank and a foundation; and a waterproof treatment method.

Solution to Problem

The above object is attained by the invention which provides a waterproof sheet and a waterproof treatment method using the sheet, as defined below.
[1] A waterproof sheet comprising a rubber base layer and a pressure-sensitive adhesive layer disposed thereon, characterized in that the rubber base comprises a silicone rubber having a JIS-A hardness of 15 to 90, a tensile strength of at least 3 MPa, an elongation of 100 to 800%, and a crescent tear strength of at least 3 kN/m.
[2] The waterproof sheet of [1] wherein the adhesive layer has a hardness which is lower than that of the rubber base and in a range of 1 to 60 on Asker C hardness scale.
[3] The waterproof sheet of [1] or [2] wherein the adhesive layer has a bond strength of 0.5 to 10 N/25 mm to glass.
[4] The waterproof sheet of any one of [1] to [3] wherein the adhesive layer comprises a pressure-sensitive adhesive silicone resin or gel.
[5] The waterproof sheet of any one of [1] to [4] wherein the rubber base has a thickness of 0.2 to 5 mm and the pressure-sensitive adhesive layer has a thickness of 0.3 to 3 mm.
[6] The waterproof sheet of any one of [1] to [5] which is applied to a boundary region between an outdoor tank and a foundation for waterproof treating the outdoor tank.
[7] A method of waterproof treating an outdoor tank installed on a foundation, a boundary region being defined between the bottom of the outdoor tank and the foundation, the method comprising the step of attaching the waterproof sheet of any one of [1] to [6] across the boundary region such that the adhesive layer of the sheet may extend from the outdoor tank to the foundation, for thereby forming a liquid tight cover to the boundary region.
[8] The waterproofing method of [7] wherein a plurality of waterproof sheets are juxtaposed to form a liquid tight cover to the boundary region and liquid-tightly overlapped to define an overlap between adjacent waterproof sheets, the overlap having a width of at least 5 mm.
[9] The waterproofing method of [7] or [8] wherein the foundation is made of concrete, mortar, asphalt concrete, asphalt mortar, or asphalt sand.

Advantageous Effects of Invention

The invention provides a waterproof sheet which serves over a long term without experiencing any loss of its physical properties and maintains waterproofness over a long term. In particular, the waterproof sheet withstands long-term service since physical properties of rubber base are specified. The method for the waterproof treatment of an outdoor tank ensures to waterproof the bottom side of the outdoor tank in a simple treatment way.

BRIEF DESCRIPTION OF DRAWINGS

FIG. 5 shows a further embodiment of the water-proofing method of the invention, (A) being a partially cutaway plan view of waterproof sheets disposed to cover the outdoor tank, foundation and boundary region therebetween and (B) being a cross-sectional view of an overlap between waterproof sheets.

DESCRIPTION OF EMBODIMENTS

The invention provides a waterproof sheet comprising a rubber base and a pressure-sensitive adhesive (PSA) layer stacked on one surface thereof. Typically a cover film is releasably attached onto the PSA layer. On use, the cover film is released before the sheet is attached such that the PSA layer is in place.

Figure 1:
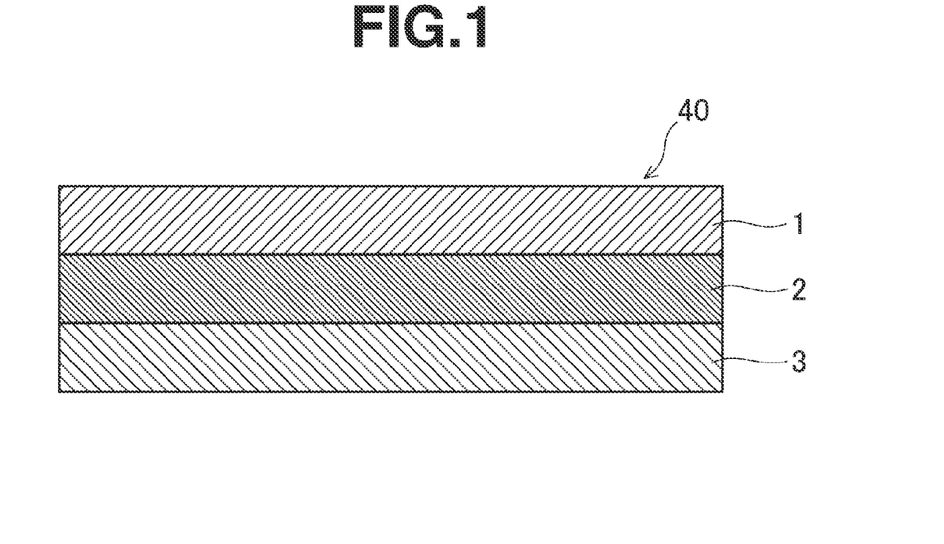
FIG. 1 is a cross-sectional view of one embodiment of the waterproof sheet of the invention.

In FIG. 1, a waterproof sheet 40 in one embodiment is illustrated as comprising a rubber base 1, a PSA layer 2, and a cover film 3.

As the rubber material of which the rubber base is composed, silicone rubber is used since it has heat resistance, weather resistance and freeze resistance. The silicone rubber used herein must have a Durometer A hardness of 15 to 90 e, a tensile strength of at least 3 MPa, an elongation of 100 to 800%, and a crescent tear strength of at least 3 kN/m, as prescribed in JIS K 6249, when elasticity, rubber strength, workability during waterproof treatment, and durability after waterproof treatment are taken into account. Because of a correlation between the rubber properties and the sheet properties, if hardness, tensile strength, elongation or tear strength is outside the range, problems arise during or after waterproof treatment. Specifically, if hardness is lower and elongation is higher, there arise problems that the sheet is readily deformable, the attachment operation during waterproof treatment becomes difficult, and the sheet is readily shifted even after attachment.

Inversely, if hardness is higher and elongation is lower, there arise problems that since the sheet lacks flexibility, operation efficiency is low in that the attachment operation during waterproof treatment requires a precision in the positioning of the sheet; and after waterproof treatment, the sheet is shifted away since the sheet does not follow the tank that undergoes repetitive cycles of thermal expansion and shrinkage with the ambient temperature.

Also, if tensile strength or tear strength is lower, there arise problems that the sheet does not fully accommodate stresses induced by recesses and protrusions on the adherend surface during waterproof treatment, and the stresses can cause damages like cuts and tears to the sheet.

Physical properties of the rubber base are described in detail. JIS K 6249 prescribes testing methods for uncured and cured silicone rubber which include several cited standards. Hardness is in accord with Durometer Type A prescribed in JIS K 6253. The rubber base in the inventive waterproof sheet has a hardness in the range of 15 to 90, preferably 20 to 85, and more preferably 25 to 80.

Tensile strength and elongation (elongation at break) resort to the testing method prescribed in JIS K 6251. The rubber base has a tensile strength of at least 3 MPa, preferably at least 4 MPa, and more preferably at least 5 MPa; and an elongation of 100 to 800%, preferably 150 to 750%, and more preferably 200 to 700%.

Tear strength resorts to the testing method prescribed in JIS K 6252. For the objects of the invention, it is desired to consider the tear strength of a crescent test piece because the stresses induced to the sheet by recesses and protrusions on the surface to be treated can cause appearance damages like cuts and tears to the sheet surface. The crescent tear strength is at least 3 kN/m, preferably at least 5 kN/m, and more preferably at least 7 kN/m.

As long as the above-specified physical properties are met, the silicone rubber may be obtained from a silicone rubber composition of any cure type. Silicone rubber compositions of addition (hydrosilylation) reaction cure type and silicone rubber compositions of organic peroxide cure type are preferred because molding is briefly completed by heating. The silicone rubber composition of addition reaction cure type used herein is a composition comprising an alkenyl-containing organopolysiloxane having at least two alkenyl groups, typically vinyl groups per molecule, an organohydrogenpolysiloxane having at least 2, preferably at least 3 SiH groups (customarily in an amount to give a molar ratio of SiH group to alkenyl group of 0.5/1 to 4/1), and a platinum group metal based addition reaction catalyst, typically platinum or platinum compound (customarily in an amount to give 1 to 1,000 ppm of platinum group metal based on the alkenyl-containing organopolysiloxane). Also, the silicone rubber composition of organic peroxide cure type used herein is a composition comprising an organopolysiloxane having at least two alkenyl groups per molecule, and an effective amount (customarily 1 to 10 parts by weight per 100 parts by weight of the organopolysiloxane) of an organic peroxide as curing agent. Examples of the organic peroxide include, but are not limited to, acyl organic peroxides such as p-methylbenzoyl peroxide and o-methylbenzoyl peroxide, alkyl organic peroxides such as dicumyl peroxide and 2,5-dimethyl-2,5-bis(tert-butylperoxy)hexane, percarbonate organic peroxides, and peroxyketal organic peroxides.

As the silicone rubber composition, any commercially available products may be used. For example, as the silicone rubber composition of addition reaction cure type, KE-541-U and KE-1990-50 from Shin-Etsu Chemical Co., Ltd. may be used. As the silicone rubber composition of organic peroxide cure type, KE-971-U and KE-675-U from Shin-Etsu Chemical Co., Ltd. may be used.

The PSA layer is formed of a silicone resin or gel having pressure-sensitive adhesion. In particular, an addition cure composition may be used to form a layer having sufficient pressure-sensitive adhesion to tightly adhere and fixedly attach to the base and various members while maintaining a certain rubber hardness and rubber strength.

In a preferred embodiment, the PSA layer is formed of an addition cure silicone rubber composition comprising the following components (A) to (D):

(A) an organopolysiloxane containing at least two silicon-bonded alkenyl groups in a molecule, (B) a resinous copolymer predominantly comprising $R_3SiO_{1/2}$ units and $SiO_2$ units wherein R is a substituted or unsubstituted monovalent hydrocarbon group and contains alkenyl, (C) an organohydrogenpolysiloxane containing at least two silicon-bonded hydrogen atoms (i.e., SiH groups) in a molecule, and (D) an addition reaction catalyst, the cured product having surface pressure-sensitive adhesion.

If necessary, the addition cure silicone rubber composition may further comprise (E) a resinous copolymer predominantly comprising $R'_3SiO_{1/2}$ units and $SiO_2$ units wherein R' is a substituted or unsubstituted monovalent hydrocarbon group and does not contain or contains alkenyl in a less amount than the alkenyl content of component (B).

In the addition cure silicone rubber composition, component (A) is an organopolysiloxane containing, on average, at least two alkenyl groups in a molecule. The organopolysiloxane (A) has the average compositional formula (1).

$$R^1_a SiO_{(4-a)/2} \tag{1}$$

In formula (1), $R^1$ is each independently a substituted or unsubstituted monovalent hydrocarbon group of 1 to 10 carbon atoms, preferably 1 to 8 carbon atoms, and a is a positive number of 1.5 to 2.8, preferably 1.8 to 2.5, and more preferably 1.95 to 2.05. Examples of the silicon-bonded substituted or unsubstituted monovalent hydrocarbon group represented by $R^1$ include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl, and naphthyl, aralkyl groups such as benzyl, phenylethyl, and phenylpropyl, alkenyl groups such as vinyl, allyl, propenyl, isopropenyl, butenyl, hexenyl, cyclohexenyl, and octenyl, and substituted forms of the foregoing in which some or all hydrogen atoms are substituted by halogen atoms (e.g., fluorine, bromine or chlorine), cyano or other radicals, such as chloromethyl, chloropropyl, bromoethyl, trifluoropropyl, and cyanoethyl. Preferably methyl accounts for at least 90 mol % of the entire $R^1$.

At least two of $R^1$ must be alkenyl groups, preferably of 2 to 8 carbon atoms, more preferably 2 to 6 carbon atoms. The alkenyl content is preferably 0.0001 to 20 mol %, more preferably 0.001 to 10 mol %, and even more preferably 0.01 to 5 mol % of the entire organic groups $R^1$ (i.e., substituted or unsubstituted monovalent hydrocarbon groups as illustrated above). The alkenyl group may be attached to the silicon atom at the end of the molecular chain, or a silicon atom midway the molecular chain, or both. It is preferred that the organopolysiloxane have at least alkenyl groups attached to the silicon atoms at both ends of the molecular chain.

While the degree of polymerization is not particularly limited, the organopolysiloxane used herein may be either liquid or gum-like at room temperature. Typically the organopolysiloxane has an average degree of polymerization of 50 to 20,000, preferably 100 to 10,000, and more preferably 100 to 2,000, as measured by gel permeation chromatography (GPC) versus polystyrene standards.

With respect to the structure, the organopolysiloxane generally has a straight chain structure whose backbone is composed of recurring diorganosiloxane ($R^1_2SiO_{2/2}$) units and which is capped with a triorganosiloxy ($R^1_3SiO_{1/2}$) or hydroxydiorganosiloxy ((HO)$R^1_2SiO_{1/2}$) group at either end of the molecular chain. However, it may have in part a branched or cyclic structure.

Component (B) is a resinous copolymer (i.e., copolymer of three-dimensional network structure) predominantly comprising $R_3SiO_{1/2}$ units and $SiO_2$ units. Herein R is a substituted or unsubstituted monovalent hydrocarbon group, preferably of 1 to 10 carbon atoms, more preferably 1 to 8 carbon atoms. Examples of the monovalent hydrocarbon group represented by R include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl, and naphthyl, aralkyl groups such as benzyl, phenylethyl, and phenylpropyl, alkenyl groups such as vinyl, allyl, propenyl, isopropenyl, butenyl, hexenyl, cyclohexenyl, and octenyl, and substituted forms of the foregoing in which some or all hydrogen atoms are substituted by halogen atoms (e.g., fluorine, bromine or chlorine), cyano or other radicals, such as chloromethyl, chloropropyl, bromoethyl, trifluoropropyl, and cyanoethyl.

The resinous copolymer as component (B) may consist of $R_3SiO_{1/2}$ units and $SiO_2$ units, or may optionally further contain $R_2SiO$ units and $RSiO_{3/2}$ units wherein R is as defined above, in a total amount of up to 50%, preferably up to 40% of the total weight of the copolymer. A molar ratio of $R_3SiO_{1/2}$ units to $SiO_2$ units, [$R_3SiO_{1/2}/SiO_2$], is in a range of 0.5/1 to 1.5/1, preferably 0.5 to 1.3. If the molar ratio is less than 0.5 or more than 1.5, satisfactory rubber hardness and strength may not be obtained. Further, the resinous copolymer (B) should preferably have at least two alkenyl groups in a molecule. The content of alkenyl group is at least 0.0001 mol/g, preferably 0.0001 to 0.003 mol/g, and more preferably 0.0002 to 0.002 mol/g. If the alkenyl content is less than 0.0001 mol/g, no sufficient rubber physical properties are available. An alkenyl content of more than 0.003 mol/g may lead to too high rubber hardness and low bond strength.

The resinous copolymer may be either a liquid one having fluidity at normal temperature (25° C.), for example, having a viscosity of at least 10 mPa·s, preferably at least 50 mPa·s, or a solid one having no fluidity. The resinous copolymer may be prepared from hydrolysis of chlorosilanes or alkoxysilanes by a technique well known in the art.

Components (A) and (B) are compounded in such amounts that component (A) is 20 to 100 parts by weight, preferably 30 to 90 parts by weight, and component (B) is 0 to 80 parts by weight, preferably 10 to 70 parts by weight, provided that the total amount of components (A) and (B) is 100 parts by weight. If the amount of component (A) is too small, the composition loses rubber elasticity and becomes brittle. If the amount of component (A) is excessive, pressure-sensitive adhesion and strength become insufficient. If the amount of component (B) is excessive, pressure-sensitive adhesion lowers and rubber physical properties are considerably degraded.

In addition to the resinous copolymer as component (B), another resinous copolymer may be compounded in the composition as component (E) if necessary. Component (E) is a resinous copolymer (i.e., copolymer of three-dimensional network structure) predominantly comprising $R'_3SiO_{1/2}$ units and $SiO_2$ units. Herein R' is a substituted or unsubstituted monovalent hydrocarbon group, preferably of 1 to 10 carbon atoms, more preferably 1 to 8 carbon atoms. Examples of the monovalent hydrocarbon group represented by R' include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl, and naphthyl, aralkyl groups such as benzyl, phenylethyl, and phenylpropyl, alkenyl groups such as vinyl, allyl, propenyl, isopropenyl, butenyl, hexenyl, cyclohexenyl, and octenyl, and substituted forms of the foregoing in which some or all hydrogen atoms are substituted by halogen atoms (e.g., fluorine, bromine or chlorine), cyano or other radicals, such as chloromethyl, chloropropyl, bromoethyl, trifluoropropyl, and cyanoethyl.

The resinous copolymer as component (E) may consist of $R'_3SiO_{1/2}$ units and $SiO_2$ units, or may optionally further contain $R'_2SiO$ units and $R'SiO_{3/2}$ units wherein R' is as defined above, in a total amount of up to 50%, preferably up to 40% of the total weight of the copolymer. A molar ratio of $R'_3SiO_{1/2}$ units to $SiO_2$ units, [$R'_3SiO_{1/2}/SiO_2$], is in a range of 0.5/1 to 1.5/1, preferably 0.5 to 1.3. If the molar ratio is less than 0.5 or more than 1.5, pressure-sensitive adhesion becomes lower. The resinous copolymer (E) should have an alkenyl content of less than 0.0001 mol/g (i.e., 0 to 0.0001 mol/g), preferably up to 0.00005 mol/g (i.e., 0 to 0.00005 mol/g), and more preferably be free of alkenyl. An alkenyl content in excess of 0.0001 mol/g adversely affects bond strength.

The resinous copolymer may be either a liquid one having fluidity at normal temperature (25° C.) or a solid one having no fluidity. A resinous copolymer which is solid at room temperature is preferable for pressure-sensitive adhesion of a cured product. The resinous copolymer may be prepared from hydrolysis of chlorosilanes or alkoxysilanes by a technique well known in the art.

If used, component (E) may be compounded in an amount of 0 to 400 parts by weight, preferably 0 to 300 parts by weight relative to 100 parts by weight of components (A) and (B) combined. If component (E) is excessive, pressure-sensitive adhesion and rubber physical properties may become poor.

It is also preferred from the standpoints of rubber physical properties and pressure-sensitive adhesion that the total content of alkenyl groups available from the resinous copolymers as components (B) and (E) be 0.00001 to 0.002 mol/g, more preferably 0.00005 to 0.001 mol/g.

Component (C) is an organohydrogenpolysiloxane containing at least two, preferably at least three silicon-bonded hydrogen atoms (i.e., SiH groups) in a molecule. It serves as a curing agent for curing the composition in that SiH groups in the molecule undergo hydrosilylation (or addition) reaction with silicon-bonded alkenyl groups in components (A), (B) and (E) to form crosslinks. Preferably the organohydrogenpolysiloxane (C) has at least two (typically 2 to 200), more preferably 3 to 100, and even more preferably 3 to 50 silicon-bonded hydrogen atoms in a molecule, and is represented by the average compositional formula (2):

$$R^2{}_b H_c SiO_{(4-b-c)/2} \tag{2}$$

wherein $R^2$ is a substituted or unsubstituted monovalent hydrocarbon group of 1 to 10 carbon atoms, b is a positive number of 0.7 to 2.1, c is a positive number of 0.001 to 1.0, and b+c is 0.8 to 3.0. The monovalent hydrocarbon groups of $R^2$ are as exemplified for $R^1$ and preferably free of aliphatic unsaturation. Preferably, b is a positive number of 0.8 to 2.0, c is a positive number of 0.01 to 1.0, and b+c is 1.0 to 2.5. The organohydrogenpolysiloxane has a molecular structure which may be linear, cyclic, branched or three-dimensional network. The preferred organohydrogenpolysiloxane is liquid at room temperature (25° C.) and has a number of silicon atoms (or degree of polymerization) of about 2 to about 300, more preferably about 4 to about 150. The hydrogen atom may be bonded to a silicon atom at the end or an intermediate of the molecular chain or both.

Instead of or in addition to the organohydrogenpolysiloxane having formula (2), a resinous copolymer predominantly comprising $R''_2HSiO_{1/2}$ units and $SiO_2$ units, or a resinous copolymer predominantly comprising $R''_2HSiO_{1/2}$ units, $R''_3SiO_{1/2}$ units, and $SiO_2$ units may be used. Herein R" is a substituted or unsubstituted monovalent hydrocarbon group, which is as exemplified above for R', and preferably free of alkenyl. This resinous copolymer may consist of $R''_2HSiO_{1/2}$ units and $SiO_2$ units, or $R''_2HSiO_{1/2}$ units, $R''_3SiO_{1/2}$ units, and $SiO_2$ units, and may optionally further contain $R''HSiO_{2/2}$ units, $R''_2SiO_{2/2}$ units, $HSiO_{3/2}$ units, and $R''SiO_{3/2}$ units in a total amount of up to 50%, preferably up to 40% of the total weight of the copolymer. A molar ratio of $R''_2HSiO_{1/2}$ and $R''_3SiO_{1/2}$ units to $SiO_2$ units, $[(R''_2HSiO_{1/2}+R''_3SiO_{1/2})/SiO_2]$ is preferably 0.5/1 to 1.5/1, more preferably 0.5 to 1.3.

Examples of the organohydrogenpolysiloxane (C) include, but are not limited to, both end trimethylsiloxy-capped methylhydrogenpolysiloxane, both end trimethylsiloxy-capped dimethylsiloxane-methylhydrogensiloxane copolymers, both end dimethylhydrogensiloxy-capped dimethylpolysiloxane, both end dimethylhydrogensiloxy-capped dimethylsiloxane-methylhydrogensiloxane copolymers, both end trimethylsiloxy-capped methylhydrogensiloxane-diphenylsiloxane copolymers, both end trimethylsiloxy-capped methylhydrogensiloxane-diphenylsiloxane-dimethylsiloxane copolymers, copolymers of $(CH_3)_2HSiO_{1/2}$ units and $SiO_{4/2}$ units, and copolymers of $(CH_3)_2HSiO_{1/2}$ units, $SiO_{4/2}$ units, and $(C_6H_5)SiO_{3/2}$ units.

The organohydrogenpolysiloxane as component (C) is blended in an amount of 0.5 to 30 parts, preferably 0.6 to 20 parts by weight per 100 parts by weight of components (A) and (B) combined. Outside the range, satisfactory rubber strength may not be obtained. Also preferably the organohydrogenpolysiloxane (C) is blended in such an amount that a molar ratio of SiH groups in component (C) to silicon-bonded alkenyl groups in components (A), (B) and (E) may range from 0.2 to 1.5, more preferably from 0.25 to 1.2, and even more preferably from 0.3 to 0.9.

Component (D) is an addition reaction catalyst. Suitable catalysts include platinum based catalysts such as platinum black, platinic chloride, chloroplatinic acid, reaction products of chloroplatinic acid with monohydric alcohols, complexes of chloroplatinic acid with olefins, complexes of chloroplatinic acid with vinylsiloxanes, and platinum bisacetoacetate; palladium based catalysts, and rhodium based catalysts. The addition reaction catalyst may be used in a catalytic amount, and typically in such an amount to provide 0.5 to 1,000 ppm, more preferably 1 to 500 ppm of platinum group metal based on the total weight of components (A), (B), and (E).

In a preferred embodiment, the PSA layer has a hardness which is lower than that of the rubber base and is a positive number of up to 60, more preferably in a range of 1 to 55, and even more preferably in a range of 2 to 40 on Asker C hardness scale. A hardness of less than 1 may lead to a poor rubber strength whereas a hardness in excess of 60 may lead to a loss of pressure-sensitive adhesion.

Also in a preferred embodiment, the PSA layer has a bond strength of 0.5 to 10 N/25 mm, more preferably 0.7 to 8 N/25 mm, when tested according to JIS Z 0237 by pressure bonding the layer to glass (FL2.0, by Nippon Sheet Glass Co., Ltd.) and peeling at a peel rate of 300 mm/min and an angle of 180°. With a bond strength of less than 0.5 N/25 mm, when the PSA layer is attached to a given adherend, the adhesive force thereto is low, giving rise to an attachment problem. A bond strength of more than 10 N/25 mm may deprive the layer of rework and re-attachment capabilities. In the practice of the treatment method, a typical material of the tank is steel, and typical materials of the foundation include concrete, asphalt and mortar. Although it is believed that in few instances, the material to which the waterproof sheet is applied is glass, the bond strength to glass is referred to herein as an index of pressure-sensitive adhesion, for the reasons that measurement values are consistent during measurement of bond strength, and that the magnitude of numerical value of bond strength to glass is correlated to the level of bond strength to other materials.

In addition to the components mentioned above, the rubber base-forming composition and the PSA layer-forming composition may further comprise optional components. Suitable components include fillers such as fumed silica, precipitated silica, ground quartz, diatomaceous earth, and calcium carbonate, electroconductive agents such as carbon black, conductive zinc white, and metal powders, and heat resistant agents such as iron oxide and cerium oxide. Further, hydrosilylation reaction regulators such as nitrogen-containing compounds, acetylene compounds, phosphorus compounds, nitrile compounds, carboxylates, tin compounds, mercury compounds, and sulfur compounds, internal parting agents such as dimethylsilicone oil, tackifiers, and thixotropic agents may be optionally added insofar as they do not inhibit crosslinking reaction.

The rubber base typically has a thickness of 0.2 to 5 mm, preferably 0.5 to 5 mm, and more preferably 0.5 to 3 mm. A thickness of less than 0.2 mm may fail to take advantage of sheet elasticity whereas a thickness in excess of 5 mm leads to an increased weight, adversely affects attachment and is costly. The PSA layer preferably has a thickness of 0.3 to 3 mm, more preferably 0.5 to 2 mm. A PSA layer of less than 0.3 mm, when applied to an adherend, may fail to accommodate surface irregularities of the adherend. A PSA layer of more than 3 mm may give rise to rubber failure because the rubber strength at the attachment interface depends on the PSA layer.

The waterproof sheet of the invention is prepared by first forming a rubber base. The rubber base may be formed as a single layer using a suitable rubber composition, typically silicone rubber composition, or as a composite layer with a layer of metals or various resins. For example, a sheet is directly formed by compression molding, casting, injection molding or the like; a sheet is formed on a metal substrate, resin substrate or resin film by insert molding; or a rubber sheet integrated with another substrate is formed by dipping, coating, calendering, screen printing or the like. Of these techniques, calendering may be advantageously used.

Next, the rubber base is overlaid with the PSA layer. In one procedure, the rubber base composition is cured into a rubber base before the PSA layer is formed thereon. In an alternative procedure, the rubber base composition is calendered or sheeted onto a film such as polyethylene terephthalate (PET), and the PSA composition is deposited on the unvulcanized rubber base composition.

The PSA composition is deposited on the rubber base layer to form a laminate sheet by a suitable technique such as dipping, coating or screen printing. Of these techniques, a layer may be advantageously formed by coating. The preferred curing conditions include 80 to 250° C. for 10 seconds to 1 hour. This may be followed by post-curing at 120° C. to 250° C. for 1 to 100 hours for the purpose of removing a lower molecular weight siloxane fraction.

As shown in FIG. 1, the waterproof sheet generally includes a cover film 3 such as polyethylene terephthalate (PET) sheet laid on a PSA layer 2 in a releasable manner. On use, the cover film 3 is peeled off, and the PSA layer 2 is attached to the given adherend.

Figure 2:
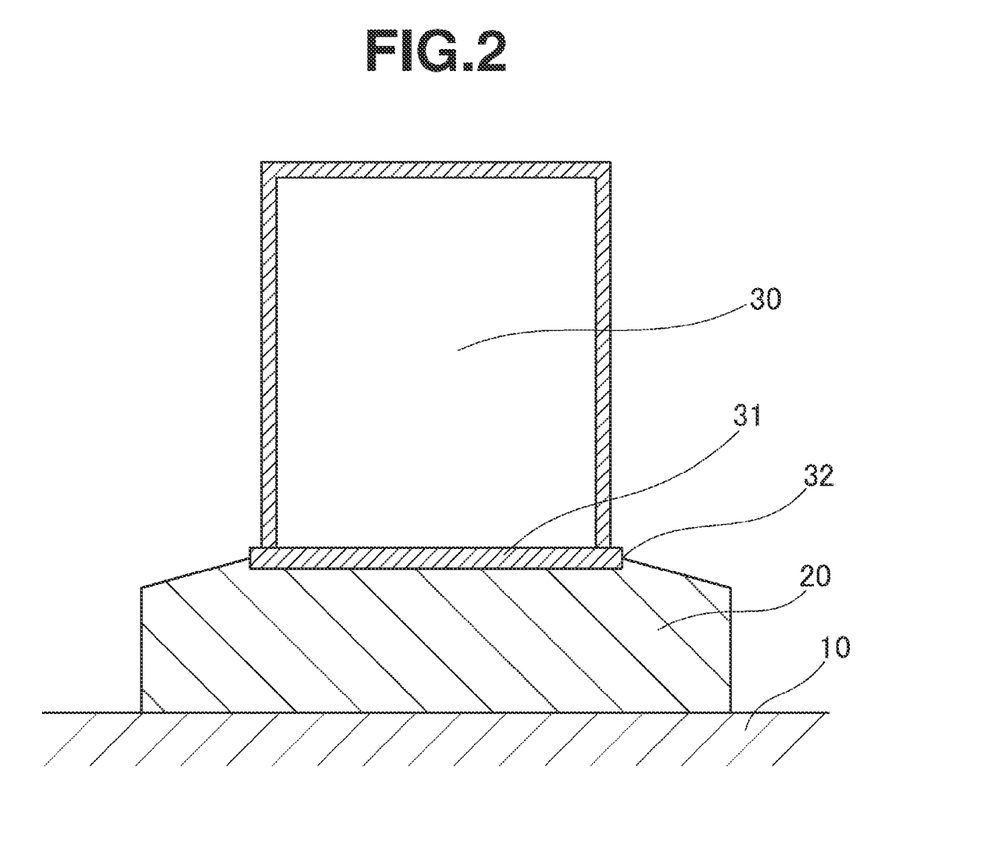
FIG. 2 is a schematic cross-sectional view showing the installation of an outdoor tank.
Figure 3:
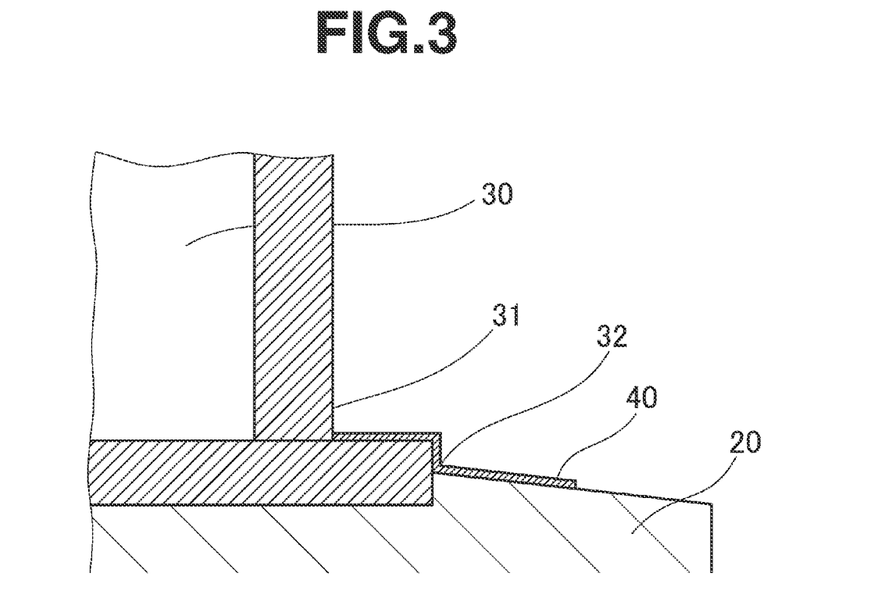
FIG. 3 is a partially cutaway cross-sectional, view showing one embodiment of the waterproofing method of the invention.
Figure 4:
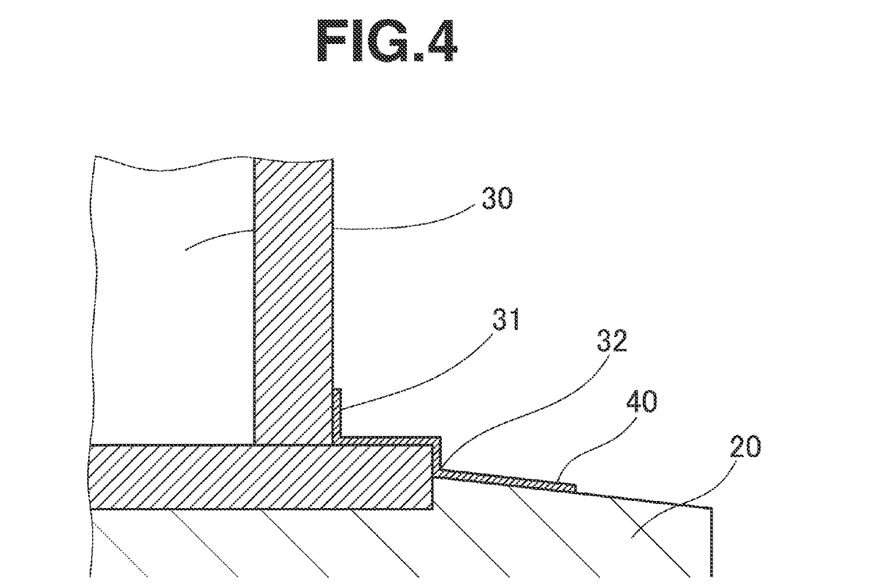
FIG. 4 is a partially cutaway cross-sectional view showing another embodiment of the waterproofing method of the invention.

The waterproof sheet may be used and applied to the boundary region between an outdoor tank at its bottom and a foundation for the purpose of preventing entry of rainwater. Referring to FIGS. 2 to 4, several exemplary methods are described. FIG. 2 shows an outdoor tank 30 installed on and supported by a foundation 20. The outdoor tank 30 is filled with a feedstock such as petroleum oils, asphalt, and gases. The tank 30 is generally cylindrical, sized to have a diameter of 10 to 80 meters and a height of 10 to 50 meters, and is installed on the foundation 20 as described above. In FIG. 2, 10 depicts the ground. The bottom of the outdoor tank 30 is constructed by an annular plate 31, and the boundary region between the outdoor tank and the foundation is specifically a boundary region 32 between the annular plate 31 and the foundation 20. Described below is one embodiment of the method for preventing rainwater from entering the boundary region 32 for thereby inhibiting rust generation at the tank bottom and tank failure.

While the foundation 20 may be any of concrete, mortar, asphalt concrete, asphalt mortar, and asphalt sand, or a combination thereof, the waterproof sheet 40 which is compatible with the foundation 20 is preferably used for the waterproof treatment.

As long as the boundary region between the outdoor tank and the foundation is completely covered with a waterproof sheet without leaving any portions uncovered, it becomes possible to prevent entry of rainwater over a long period of time, inhibiting rust from generating at the tank bottom, i.e., annular plate and preventing tank failure. Referring to FIG. 3, one embodiment of coverage of the boundary region with the waterproof sheet is described. A waterproof sheet 40 is attached so as to cover the boundary region 32 between the foundation 20 and the annular plate 31. As shown in FIG. 4, the waterproof sheet 40 may be attached so as to cover even the side wall of the outdoor tank.

Figure 5A:
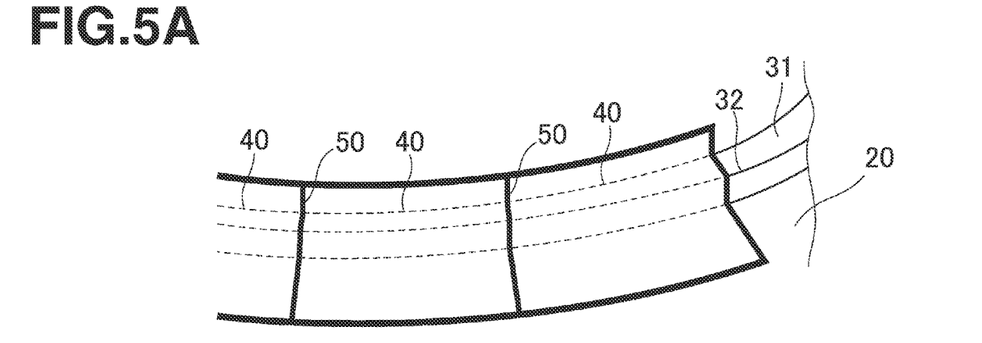

In most cases, a plurality of waterproof sheets are used. They are juxtaposed along the boundary region so that the entire boundary region is covered with the waterproof sheets. The area which may be readily exposed externally in the boundary region between the outdoor tank and the foundation is the interface between adjacent waterproof sheets. Referring to FIG. 5, adjacent waterproof sheets are preferably overlapped. The overlap 50 between adjacent waterproof sheets preferably has a width of at least 5 mm, more preferably at least 10 mm, and even more preferably at least 20 mm. If the width of the overlap between adjacent waterproof sheets is less than 5 mm, peel may occur during the waterproof treatment, failing in complete coverage of the boundary region 32, with potential entry of rainwater. If the width of the overlap between adjacent waterproof sheets is greater, for example, 50 mm or more, then the number of waterproof sheets necessary to cover the boundary region 32 entirely becomes larger, leading to an increased cost.

For the treatment where the waterproof sheet is attached to the foundation and the annular plate or outdoor tank, the PSA layer of the waterproof sheet preferably has a bond strength of 0.5 to 10 N/25 mm between the outdoor tank and the waterproof sheet and 0.5 to 10 N/25 mm between the foundation and the waterproof sheet. Use of the waterproof sheet having a bond strength in the range can prevent penetration of rainwater through the interface between the outdoor tank and the waterproof sheet and the interface between the foundation and the waterproof sheet over a long period of time. If the bond strength is below the range, peel may often occur, and rainwater may penetrate through the peeled areas. If the bond strength is above the range, partial re-attaching operation necessary to cover the boundary region completely during waterproof treatment may become difficult, taking a longer treatment time. If the bond strength is further higher, re-attaching operation is impossible, failing to cover the boundary region completely.

Figure 5B:
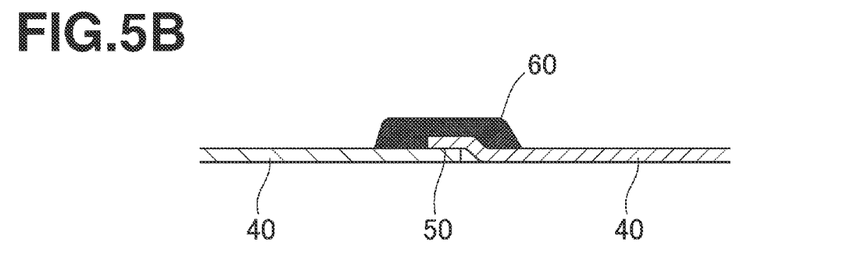
Figure 6:
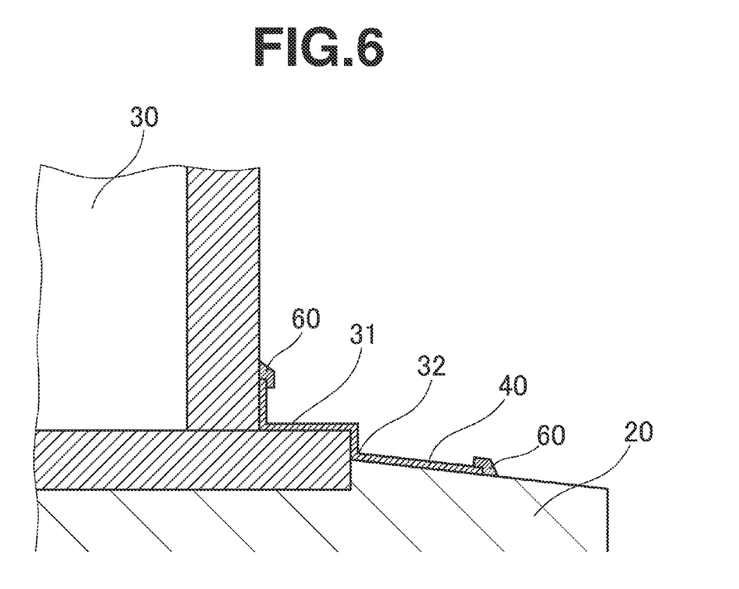
FIG. 6 is a partially cutaway cross-sectional view showing a still further embodiment of the waterproofing method of the invention wherein outer peripheries of a waterproof sheet are bonded with a sealant.

Further preferably, as shown in FIG. 6, a sealant 60 is applied to and disposed on those edges of the waterproof sheet 40 disposed adjacent to the outdoor tank 30 and the foundation 20. This ensures better waterproof treatment. It is also preferred to apply the sealant 60 so as to cover the overlaps 50 as shown in FIG. 5 (B).

The sealant used herein may be any of well-known silicone, polysulfide and polyurethane base sealants, with the silicone base sealants being preferred for the treatment method. As the sealant, Sealant Master 300, Sealant 70, Sealant 701 and the like, available from Shin-Etsu Chemical Co., Ltd. may be used.

The use of the waterproof sheet of the invention enables primer-less waterproof treatment, achieving a drastic reduction of the working duration.

With respect to the tanks installed in refinery and other plants as mentioned previously, it is legally required to mount a rainwater-proofing means to the annular plate and foundation.

The waterproofing means is most commonly an array of butyl rubber sheets. However, in the environment where water droplets are condensed due to a weather temperature difference or a very high humidity resulting from rain and snow, the butyl rubber sheets cannot be applied until the adherend surface is dried. The primer-less application ability of the waterproof sheet of the invention ensures that even when the adherend surface is wet, the sheet can be applied simply after the adherend surface is wiped with fabrics or wastes. This leads to the epoch-making advantage that waterproof treatment can be started immediately after the weather becomes good. In general, the oil or hazardous stock-containing large-volume tanks installed in refinery and other plants must be inspected for safety management every several years, as prescribed in the fire service act. On such inspection, the rainwater-proofing means must be detached before the junction can be observed. Since the currently used butyl rubber sheets, sealants, and petroleum-based waterproof sheets have been applied using primers, it is difficult to detach these sheets to see the underneath structure.

Since the waterproof sheet of the invention exerts the waterproof function by virtue of pressure-sensitive adhesion, the sheet can be readily detached just after the securing sealant at the edge of the sheet is removed, whereupon the underneath structure is inspected.

The waterproof sheet is also characterized by exerting the waterproof function again by virtue of pressure-sensitive adhesion.

EXAMPLES

Examples and Comparative Examples are given below for illustrating the invention although the invention is not limited thereto. In Examples, all parts and percents are by weight.

Example 1

A rubber base layer was formed from a dimethylsilicone rubber composition, which was prepared by providing 100 parts of a millable dimethylsilicone rubber compound KE-675-U (Shin-Etsu Chemical Co., Ltd.), adding thereto 0.5/2.5 parts of addition or hydrosilylation reaction vulcanizing agent C-19A/B (Shin-Etsu Chemical Co., Ltd.), and milling on a two-roll mill. The composition was calendered onto an embossed PET film of 100 μm thick to form a layer of 0.7 mm thick, and continuously heat cured in a heating furnace at 140° C. for 10 minutes, obtaining a sheet having a rubber base layer disposed on a PET film.

A PSA layer was formed from a PSA composition, which was prepared by feeding into an agitation mixer 75 parts of both end dimethylvinylsiloxy-capped dimethylpolysiloxane (1) having an average degree of polymerization of 1,000, and a 50% toluene solution containing 25 parts of resinous copolymer (2) which is solid at room temperature (25° C.) and consists of $(CH_2=CH)(CH_3)_2SiO_{1/2}$ units, $(CH_3)_3SiO_{1/2}$ units and $SiO_2$ units wherein a molar ratio $[\{(CH_2=CH)(CH_3)_2SiO_{1/2}+(CH_3)_3SiO_{1/2}\}/SiO_2]$ is 0.85 and a $CH_2=CH-$ content is 0.0008 mol/g, mixing the contents for 30 minutes, and fully distilling off the toluene. To 100 parts of the resulting silicone rubber base were added 0.9 part of resinous copolymer (4) composed mainly of $(CH_3)_2HSiO_{1/2}$ units and $SiO_2$ units and having SiH groups, with a SiH content of 0.0090 mol/g as a crosslinker and 0.05 part of ethynyl cyclohexanol as a reaction regulator. Agitation was continued for 15 minutes. The resulting silicone rubber composition was combined with 0.1 part of a platinum catalyst (Pt concentration 1%), yielding the PSA composition.

The PSA composition was coated on the rubber base layer to a thickness of 1.0 mm using a comma coater, and heat cured in a heating furnace at 140° C. for 10 minutes, yielding a two-layer cured laminate sheet. The rubber base had a hardness of 68 on Durometer Type A hardness scale, and the PSA layer had a hardness of 15 on Asker C hardness scale.

The rubber base-adjacent PET film was peeled from the laminate, leaving a waterproof sheet which was evaluated by several tests to be described later. The results are shown in Table 1.

In a waterproof test, a plurality of waterproof sheets of 30 cm by 100 cm, obtained as above, were sequentially attached across the boundary region between an outdoor tank and a foundation as shown in FIG. 5. Sealant Master 300 was applied as the sealant to bond the waterproof sheets to the tank or foundation over a distance of 2 cm from the sheet periphery.

Example 2

A rubber base layer was formed from a dimethylsilicone rubber composition, which was prepared by adding 1.0 part of organic peroxide vulcanizing agent C-23N (Shin-Etsu Chemical Co., Ltd.) to 100 parts of a millable dimethylsilicone rubber compound KE-675-U (Shin-Etsu Chemical Co., Ltd.), and milling on a two-roll mill. The composition was calendered onto an embossed PET film of 100 μm thick to form a layer of 0.7 mm thick, and continuously heat cured in a heating furnace at 140° C. for 10 minutes, obtaining a sheet having a rubber base layer disposed on a PET film.

The subsequent procedures including preparation of PSA layer and lamination were carried out as in Example 1.

Example 3

Compound A was prepared by combining 100 parts of organopolysiloxane consisting of 99.625 mol % dimethylsiloxane units $((CH_3)_2SiO_{2/2})$, 0.350 mol % methylvinylsiloxane units $((CH_2=CH)(CH_3)SiO_{2/2})$, and 0.025 mol % dimethylvinylsiloxy units $((CH_2=CH)(CH_3)_2SiO_{1/2})$ and having a degree of polymerization of ~6,000, with 10 parts of fumed silica having a BET specific surface area of 200 m$^2$/g (trade name Aerosil 200 by Nippon Aerosil Co., Ltd.) and 8 parts of hydroxy-terminated dimethylsiloxane having an average degree of polymerization of 4 as a dispersant, milling on a kneader, and heat treating at 170° C. for 2 hours.

A dimethylsilicone rubber composition was prepared by adding 0.5/2.5 parts of addition or hydrosilylation reaction vulcanizing agent C-19A/B (Shin-Etsu Chemical Co., Ltd.) to 100 parts of Compound A, and milling on a two-roll mill. The composition was calendered onto an embossed PET film of 100 μm thick to form a layer of 0.7 mm thick, and continuously heat cured in a heating furnace at 140° C. for 10 minutes, obtaining a sheet having a rubber base layer disposed on a PET film.

The subsequent procedures including preparation of PSA layer and lamination were carried out as in Example 1.

Example 4

A rubber base layer was formed from a dimethylsilicone rubber composition, which was prepared by adding 0.5/2.5 parts of addition or hydrosilylation reaction vulcanizing agent C-19A/B (Shin-Etsu Chemical Co., Ltd.) to 100 parts of a millable dimethylsilicone rubber compound KE-541-U (Shin-Etsu Chemical Co., Ltd.), and milling on a two-roll mill. The composition was calendered onto an embossed PET film of 100 μm thick to form a layer of 0.7 mm thick, and continuously heat cured in a heating furnace at 140° C. for 10 minutes, obtaining a sheet having a rubber base layer disposed on a PET film.

The subsequent procedures including preparation of PSA layer and lamination were carried out as in Example 1.

Example 5

Liquid silicones KE-1990-50A and KE-1900-50B (Shin-Etsu Chemical Co., Ltd.), each 100 parts, were mixed on a mixer for 15 minutes. The resulting liquid silicone composition was coated onto an embossed PET film of 100 μm thick to form a layer of 0.7 mm thick using a comma coater, and continuously heat cured in a heating furnace at 140° C. for 10 minutes, obtaining a sheet having a rubber base layer disposed on a PET film.

The subsequent procedures including preparation of PSA layer and lamination were carried out as in Example 1.

Comparative Example 1

Compound B was prepared by combining 100 parts of organopolysiloxane consisting of 99.922 mol % dimethylsiloxane units (($CH_3$)$_2$$SiO_{2/2}$), 0.053 mol % methylvinylsiloxane units H$CH_2$=CH)($CH_3$)$SiO_{2/2}$), and 0.025 mol % dimethylvinylsiloxy units (($CH_2$=CH)($CH_3$)$_2$$SiO_{1/2}$) and having a degree of polymerization of ~6,000, with 10 parts of fumed silica having a BET specific surface area of 200 m$^2$/g (trade name Aerosil 200 by Nippon Aerosil Co., Ltd.) and 8 parts of hydroxy-terminated dimethylsiloxane having an average degree of polymerization of 4 as a dispersant, milling on a kneader, and heat treating at 170° C. for 2 hours.

A dimethylsilicone rubber composition was prepared by adding 1.0 part of organic peroxide vulcanizing agent C-23N (Shin-Etsu Chemical Co., Ltd.) to 100 parts of Compound B, and milling on a two-roll mill. The composition was calendered onto an embossed PET film of 100 μm thick to form a layer of 0.7 mm thick, and continuously heat cured in a heating furnace at 140° C. for 10 minutes, obtaining a sheet having a rubber base layer disposed on a PET film.

The subsequent procedures including preparation of PSA layer and lamination were carried out as in Example 1.

The rubber base-adjacent PET film was peeled from the laminate, leaving a waterproof sheet which was evaluated by the tests described later. The results are shown in Table 2.

Comparative Example 2

Compound C-M was prepared by combining 100 parts of organopolysiloxane consisting of 99.825 mol % dimethylsiloxane units (($CH_3$)$_2$$SiO_{2/2}$), 0.150 mol % methylvinylsiloxane units (($CH_2$=CH)($CH_3$)$SiO_{2/2}$), and 0.025 mol % dimethylvinylsiloxy units (($CH_2$=CH)($CH_3$)$_2$$SiO_{1/2}$) and having a degree of polymerization of ~6,000, with 60 parts of fumed silica having a BET specific surface area of 200 m$^2$/g (trade name Aerosil 200 by Nippon Aerosil Co., Ltd.) and 15 parts of hydroxy-terminated dimethylsiloxane having an average degree of polymerization of 4 as a dispersant, milling on a kneader, and heat treating at 170° C. for 2 hours.

Compound C was prepared by adding 70 parts of diatomaceous earth (trade name Celite SF) and 1 part of hydroxy-terminated dimethylsiloxane having an average degree of polymerization of 15 as a dispersant to 100 parts of Compound C-M on a two-roll mill.

The subsequent procedures including sheet formation, preparation of PSA layer and lamination were carried out as in Comparative Example 1.

Comparative Example 3

Compound D was prepared by combining 100 parts of organopolysiloxane consisting of 99.892 mol % dimethylsiloxane units (($CH_3$)$_2$$SiO_{2/2}$), 0.083 mol % methylvinylsiloxane units (($CH_2$=CH)($CH_3$) $SiO_{2/2}$), and 0.025 mol % dimethylvinylsiloxy units (($CH_2$=CH)($CH_3$)$_2$$SiO_{1/2}$) and having a degree of polymerization of ~6,000, with 5 parts of fumed silica having a BET specific surface area of 130 m$^2$/g (trade name Aerosil 130 by Nippon Aerosil Co., Ltd.) and 1 part of hydroxy-terminated dimethylsiloxane having an average degree of polymerization of 4 as a dispersant, milling on a kneader, and heat treating at 170° C. for 2 hours.

The subsequent procedures including sheet formation, preparation of PSA layer and lamination were carried out as in Comparative Example 1.

Comparative Example 4

Compound E was prepared by combining 100 parts of organopolysiloxane consisting of 99.540 mol % dimethylsiloxane units (($CH_3$)$_2$$SiO_{2/2}$), 0.435 mol % methylvinylsiloxane units (($CH_2$=CH)($CH_3$) $SiO_{2/2}$), and 0.025 mol % dimethylvinylsiloxy units (($CH_2$=CH)($CH_3$)$_2$$SiO_{1/2}$) and having a degree of polymerization of ~6,000, with 50 parts of carbon black (trade name Denka Black by Denki Kagaku Kogyo K.K.), 140 parts of crystalline silica (trade name Crystalite VX-ST), and 1 part of hydroxy-terminated methylvinylsiloxane as a dispersant, and milling on a pressure kneader.

The subsequent procedures including sheet formation, preparation of PSA layer and lamination were carried out as in Comparative Example 1 except that 0.5/2.5 parts of addition or hydrosilylation reaction vulcanizing agent C-19A/B (Shin-Etsu Chemical Co., Ltd.) was added to Compound E.

Comparative Example 5

Compound F was prepared by combining 100 parts of organopolysiloxane consisting of 99.930 mol % dimethylsiloxane units (($CH_3$)$_2$$SiO_{2/2}$), 0.045 mol % methylvinylsiloxane units (($CH_2$=CH)($CH_3$)$SiO_{2/2}$), and 0.025 mol % dimethylvinylsiloxy units (($CH_2$=CH)($CH_3$)$_2$$SiO_{1/2}$) and having a degree of polymerization of ~6,000, with 20 parts of treated silica having a BET specific surface area of 210 m$^2$/g (trade name Aerosil R976 by Nippon Aerosil Co., Ltd.) and 1 part of hydroxy-terminated dimethylsiloxane having an average degree of polymerization of 4 as a dispersant, milling on a kneader, and heat treating at 170° C. for 2 hours.

The subsequent procedures including sheet formation, preparation of PSA layer and lamination were carried out as in Comparative Example 1.

[Evaluation Tests]

Pressure-sensitive Adhesion

The waterproof sheet was cut into samples of 25 mm wide by 100 mm long. According to JIS Z 0237, the sheet sample was attached to a 4-mm thick plate of glass FL2.0 (Nippon Sheet Glass Co., Ltd.) which had been degreased with alcohol and air dried, with the PSA layer in contact with the plate. A bond strength was measured by peeling the PSA layer from the glass plate at room temperature, a rate of 300 mm/min, and an angle of 180°.

Long-term Attachment Stability

The waterproof sheet was cut into samples of 25 mm wide by 100 mm long. The sheet sample was attached to a 4-mm thick glass plate, with the PSA layer in contact with the plate. The assembly was stored at room temperature and a humidity of 50% RH for one month before a bond strength was measured by peeling the PSA layer from the glass plate at room temperature, a rate of 300 mm/min, and an angle of 180°.

Re-peeling

The waterproof sheet was cut into samples of 25 mm wide by 100 mm long. The sheet sample was attached to a 4-mm thick glass plate, with the PSA layer in contact with the glass plate. The assembly was stored at room temperature and a humidity of 50% RH for one month before the PSA layer was peeled from the glass plate at room temperature, a rate of 300 mm/min, and an angle of 180°. It was examined whether or not any sticky component was transferred to the glass surface. The sample was rated NG (x) when transferred or OK (○) when not transferred.

Elasticity to Deformation

The laminate sheet was bent 180° whereupon it was examined whether or not the sheet was damaged. The sample was rated OK (○) when the sheet was intact or NG (x) when cracked and deformed.

Waterproofness

Initial waterproofness was evaluated after one month of weathering from the treatment and rated OK (○) for no rainwater entry or NG (x) when rainwater entry was found.

Long-term waterproofness was evaluated after 6 months of weathering from the treatment and rated OK (○) for no rainwater entry or NG (x) when rainwater entry was found.

TABLE 1

|  | Example 1 | Example 2 | Example 3 | Example 4 | Example 5 |
|---|---|---|---|---|---|
| Rubber base | KE-675-U | KE-675-U | A | KE-541-D | KE-1990-50 (addition) |
| Vulcanizing agent | C-19A/B | C-23N | C-19A/B | C-19A/B | |
| Hardness, Durometer Type A | 68 | 75 | 70 | 40 | 50 |
| Tensile strength (MPa) | 8.5 | 8.5 | 10.1 | 8.2 | 7.0 |
| Elongation at break (%) | 270 | 250 | 500 | 650 | 300 |
| Tear strength, crescent (kN/m) | 10 | 11 | 42 | 22 | 7 |
| Bond strength to glass (N/25 mm) | 3.4 | 3.1 | 3.3 | 3.8 | 3.6 |
| Long-term attachment stability to glass (N/25 mm) | 3.2 | 3.1 | 3.3 | 3.7 | 3.6 |
| Re-peeling | ○ | ○ | ○ | ○ | ○ |
| Elasticity to deformation | ○ | ○ | ○ | ○ | ○ |
| Initial waterproofness | ○ | ○ | ○ | ○ | ○ |
| Long-term waterproofness | ○ | ○ | ○ | ○ | ○ |

TABLE 2

|  | Comparative Example 1 | Comparative Example 2 | Comparative Example 3 | Comparative Example 4 | Comparative Example 5 |
|---|---|---|---|---|---|
| Rubber base | B | C-M | D | E | F |
| Vulcanizing agent | C-23N | C-23N | C-23N | C-19A/B | C-23N |
| Hardness, Durometer Type A | 11 | 91 | 18 | 85 | 25 |
| Tensile strength (MPa) | 4.5 | 6.6 | 2.5 | 6.4 | 9.9 |
| Elongation at break (%) | 770 | 125 | 400 | 70 | 960 |
| Tear strength, crescent (kN/m) | 10 | 6 | 2 | 7 | 14 |
| Bond strength to glass (N/25 mm) | 3.6 | 3.3 | 3.6 | 3.1 | 3.6 |
| Long-term attachment stability to glass (N/25 mm) | 3.5 | 3.1 | 2.6 | 2.5 | 3.5 |
| Re-peeling | ○ | ○ | ○ | ○ | ○ |
| Elasticity to deformation | ○ | ○ | x | x | ○ |
| Initial waterproofness | ○ | ○ | ○ | ○ | ○ |
| Long-term waterproofness | x | x | x | x | x |

REFERENCE SIGNS LIST 1 rubber base
2 PSA layer
3 cover film
10 ground
20 foundation
30 outdoor tank
31 annular plate (part of outdoor tank)
32 boundary region between outdoor tank and foundation
40 waterproof sheet
50 overlap
60 sealant

The invention claimed is:

1. A waterproof sheet comprising a rubber base layer and a pressure-sensitive adhesive layer disposed thereon,
   wherein the rubber base layer comprises a silicone rubber having a JIS-A hardness of 25 to 80, a tensile strength of at least 5 MPa, an elongation of 200 to 700%, a crescent tear strength of at least 7 kN/m, and a thickness of 0.2 to 5 millimeters, and
   wherein the pressure-sensitive adhesive layer comprises a pressure-sensitive adhesive silicone resin or gel formed of an addition-cure silicone rubber composition comprising:

(A) 30 to 90 parts by weight of an organopolysiloxane containing at least two silicon-bonded alkenyl groups in a molecule;

(B) 10 to 70 parts by weight of a resinous copolymer predominantly comprising $R_3SiO_{1/2}$ units and $SiO_2$ units wherein R is a substituted or unsubstituted monovalent hydrocarbon group and contains alkenyl, a molar ratio of $R_3SiO_{1/2}$ units to $SiO_2$ units ($R_3SiO_{1/2}/SiO_2$) being in a range of 0.5/1 to 1.5/1;

(C) 0.5 to 30 parts by weight of an organohydrogenpolysiloxane containing at least two silicon-bonded hydrogen atoms (SiH groups) in a molecule; and (D) an addition reaction catalyst in an amount that provides 0.5 to 1000 ppm of platinum group metal based on the total weight of components (A) and (B), said pressure-sensitive adhesive layer having a hardness lower than the hardness of the rubber base, the hardness of the pressure-sensitive adhesive layer being in a range of 1 to 40 on the Asker C hardness scale, said pressure-sensitive adhesive layer having a thickness of 0.3 to 3 millimeters.

2. The waterproof sheet of claim 1, wherein the pressure-sensitive adhesive layer has a bond strength of 0.5 to 10 N/25 mm to glass.

3. The waterproof sheet of claim 1 which is applied to a boundary region between an outdoor tank and a foundation for waterproof treating the outdoor tank.

4. A method of waterproof treating an outdoor tank installed on a foundation, a boundary region being defined between the bottom of the outdoor tank and the foundation, the method comprising the step of attaching the waterproof sheet of claim 1 across the boundary region such that the adhesive layer of the sheet may extend from the outdoor tank to the foundation, for thereby forming a liquid tight cover to the boundary region.

5. The waterproofing method of claim 4 wherein a plurality of waterproof sheets are juxtaposed to form a liquid tight cover to the boundary region and liquid-tightly overlapped to define an overlap between adjacent waterproof sheets, the overlap having a width of at least 5 mm.

6. The waterproofing method of claim 4 or 5 wherein the foundation is made of concrete, mortar, asphalt concrete, asphalt mortar, or asphalt sand.

7. The waterproof sheet of claim 1, wherein the silicone rubber of the rubber base layer has a JIS-A hardness of 40 to 75, a tensile strength of 7.0 to 10.1 MPa, an elongation of 250 to 650%, and a crescent tear strength of 7 to 42.

* * * * *